G. C. STACY.
COTTON CLEANER.
APPLICATION FILED APR. 15, 1915.
1,192,469.
Patented July 25, 1916.
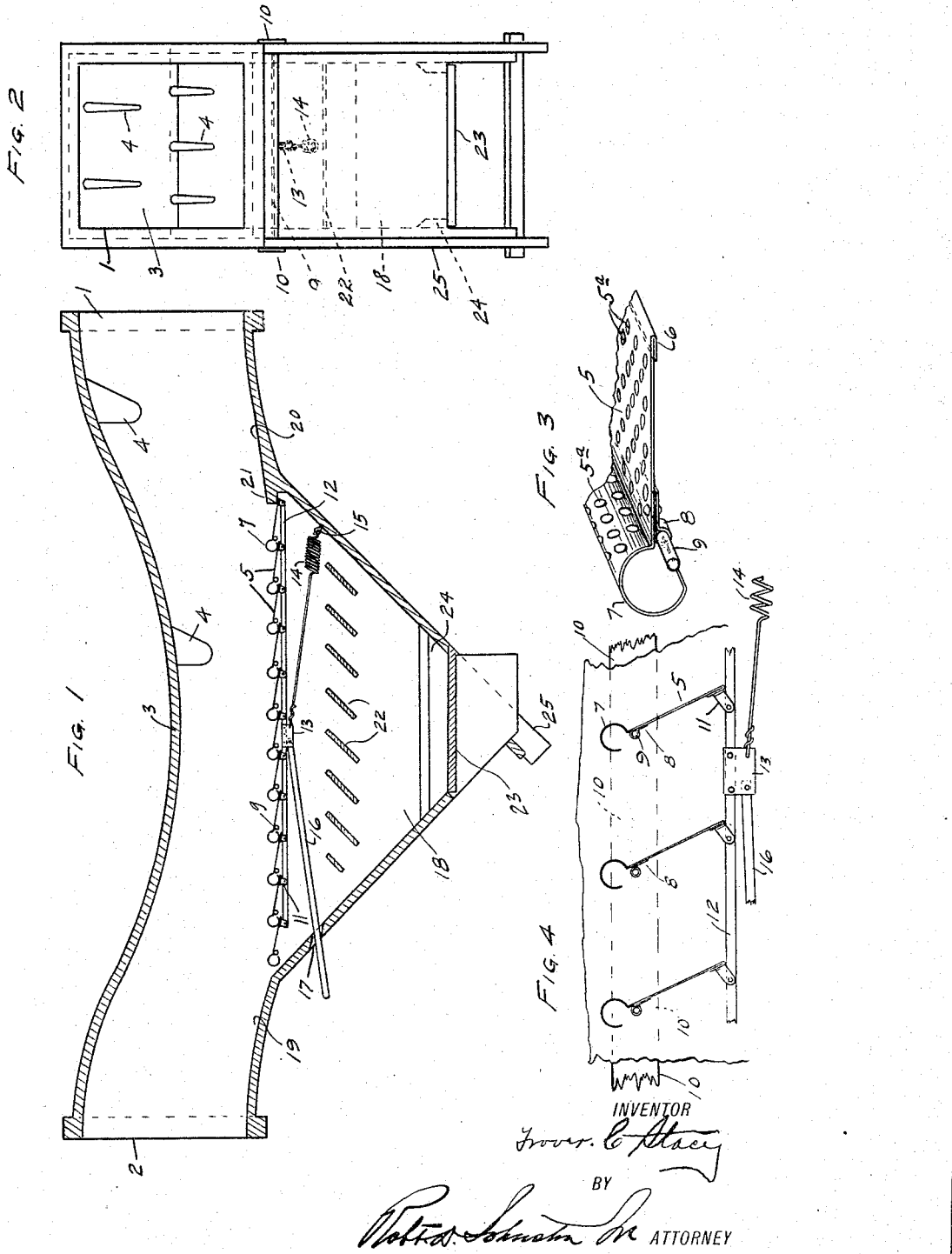

---

UNITED STATES PATENT OFFICE.

GROVER CLEVELAND STACY, OF BIRMINGHAM, ALABAMA, ASSIGNOR OF ONE-THIRD TO T. H. SPENCER AND ONE-SEVENTH TO J. G. TIDWELL, BOTH OF BIRMINGHAM, ALABAMA.

COTTON-CLEANER.

1,192,469.  Specification of Letters Patent.  Patented July 25, 1916.

Application filed April 15, 1915. Serial No. 21,599.

*To all whom it may concern:*

Be it known that I, GROVER CLEVELAND STACY, a citizen of the United States of America, residing at Birmingham, in the county of Jefferson and State of Alabama, have invented certain new and useful Improvements in Cotton-Cleaners, of which the following is a specification.

My invention relates to a cleaner for seed cotton which will take out the rocks, gravel, nails and like heavy foreign matter from the seed cotton before it is delivered to the gin.

According to my invention I interpose in the cotton supply tube or elevator, through which the seed cotton is fed by air to the gin, a cleaner box having in its bottom a hopper and having above the hopper a convex wall carrying dependent fingers which divide the cotton and coöperate with the convex wall to deflect the cotton against the shutter valve. This shutter valve, which is one of the distinctive features of my invention, is disposed in a horizontal plane across the upper end of the hopper and joins at its ends the gradually down curved bottom walls of the inlet and outlet ends of the cleaner. The shutter valve is composed of a plurality of hinged slats which in operating position are adapted to lap each other and lie nearly horizontal so as to form a series of shallow transverse pockets. The slats are adapted to be swung downwardly to open up and discharge the foreign matter thereon into the hopper, and they are provided with a plurality of perforations, both in their body portions and in the rounded head provided on each adjacent to its pivot end. Below the valve I provide a plurality of rigid baffles so designed and arranged as to prevent eddy currents of air in the hopper which might suck the cotton against the valve and interfere with the effective operation of the cleaner.

My invention further comprises the novel details of construction and arrangements of parts which are hereinafter claimed, and which in their preferred embodiment only are described in the accompanying specification, in which reference is made to the drawings, wherein:—

Figure 1 is a longitudinal vertical sectional view of the cleaner. Fig. 2 is an end elevation of Fig. 1. Fig. 3 is a detail fragmental view of one of the valve slats. Fig. 4 is a side view of a number of the valve slats shown enlarged and in open position.

Similar reference numerals refer to similar parts throughout the drawings.

In the preferred embodiment of my invention illustrated in the drawings, the cleaner is formed by a casing of wood or suitable material having an inlet 1 and an outlet end 2, which ends are preferably of a size to form part of a suction conveyer tube for delivering the seed cotton to the gin. The end openings of the casing are conformed to the shape of the suction tube and the top wall 3 is deflected downwardly on a gradual convex curve extending from end to end of the casing and is provided near the inlet end with a number of fingers 4. These fingers are arranged in two transverse rows and are staggered so that they will engage all of the cotton that is drawn through the casing and will open it up and at the same time coöperate with the convex top wall in deflecting the cotton against the shutter valve where it is cleaned. This shutter valve is formed by a plurality of slats 5 which are each formed by a foraminous plate doubled back at its forward or free end to form a reinforcing lip 6, and at its rear or pivot end it is bent to form a rounded head 7, which is also provided with openings 5ª and is left open under the bottom. Each slat is provided on its underface near its head 7 with hinge straps 8 by means of which it is connected to a pivot rod 9. This rod extends from end to end under the slat and is seated in holes bored to receive it in the side walls of the casing. The outer ends of the holes are covered by battens 10 which hold the rods 9 in position between them and prevent any substantial leakage of air into the casing through these openings. Near the center of the free end of each slat I provide a dependent perforated lug 11 and these several lugs are all pivotally connected to a common operating rod 12 which extends lengthwise of and under the valve and has rigidly connected to its center a plate 13. This plate is connected at one end to a coiled spring 14 which is suitably connected to the inlet end wall of the hopper by an eye screw 15, and at its opposite end the plate is pivotally connected to an operating rod 16 which extends through a small opening 17 provided for it in the outlet end wall of the casing.

By drawing the operating rod 16 outwardly by connections (not shown) leading to convenient operating points, the rod 12 is caused to swing down moving the slats pivotally about their bearing rods 9 and opening them so as to effectively discharge any foreign matter that they have collected from the cotton into the body of the hopper 18 which is formed in the bottom of the casing. At one end, the hopper is connected to a down curved bottom wall 19 of the outlet end of the casing and at its other end it is connected to a similarly down turned curved wall 20 of the inlet end, it being noted at the junction of the hopper with wall 20, an undercut shoulder 21 is provided and arranged to overlap the forward end of the adjacent valve slat. I arrange transversely of the hopper a series of fixed baffles 22 which are spaced sufficiently below the valve to avoid interference with the opening movements of its slats and the several baffles are spaced sufficiently from each other and from the end walls of the hopper to permit any foreign objects which may be collected and discharged through the valve to pass freely between the baffles. In the bottom of the hopper is provided a flap door 23 which is normally held closed by the suction and which is automatically released with the breaking of the suction to discharge any foreign matter that collects thereon in the hopper. The side walls of the hopper are reinforced by external battens 25 and internal plates 24.

In operation, the seed cotton, as it is drawn into the casing by the action of the suction blast through the end 1, will strike the convex top wall 3 and fingers 4 and by them will be directed downwardly so as to strike upon the valve. It will be noted that the valve is arranged with its slats substantially in a horizontal plane and that the pockets formed between the tubular end 7 of the plates are relatively shallow transverse pockets which are normally closed except for the perforations therein. The design of the slats and the arrangement of the pockets is such that the cotton will not be caught thereby nor will it tend to accumulate in the pockets but will be carried along over the slat valve by the action of the suction blast and will rid itself of any foreign matter heavier than the cotton. In this respect my invention differs substantially from other cleaners, in all of which the arrangement of the slat valve is such as to cause the cotton to work into the hopper or to be caught in the valve and when any piece of cotton becomes caught in the valve it causes a quick accumulation of cotton until the cleaner is practically blocked and rendered ineffective for cleaning purposes. The spring or other equivalent means used to hold the valve slats in their closed lapping position should be strong enough to resist the impact of the cotton which strikes with considerable force against the valve slats and tends to force them open. I have also found that where the valve slats are slotted or perforated so as to permit the air to gain ready access to the hopper below the valve, the air eddies in the hopper below the valve will create a down suction which will suck the cotton against the valve until it starts an accumulation of cotton thereon and destroys the effectiveness of the cleaner. The arrangement of the baffles is intended to counteract this eddy tendency and as a result my valve permits the cotton when directed against it to free itself completely of the heavier foreign matter and to work across the valve without being caught or arrested.

Having thus described my invention, what I claim as new and desire to secure by Letters Patent, is:—

1. In a cotton cleaner of the character described, the combination of a suction cotton conveying tube, a shutter valve in said tube, a convex wall in the tube opposite the valve and adapted to deflect the cotton against the valve, pivoted slats forming the valve and having each one side edge bent up to form a raised shoulder and then bent over and down to overlap and engage the adjacent slat, said slats forming in operating position shallow transverse pockets which are closed except for restricted bottom openings therethrough, and a hopper below the valve, substantially as described.

2. In a cleaner for seed cotton, the combination of a shutter valve located in the cotton supply tube and formed by a series of pivoted slats, each slat being formed by a perforated plate which has a perforated edge portion bent up and rounded over to form an open bottomed tubiform head, pivots near the headed edge of the slat, and a hopper bridged by the valve, substantially as described.

In testimony whereof I affix my signature in presence of a witness.

GROVER CLEVELAND STACY.

Witness:
    NOMIE WELSH.